(No Model.)
H. FRENCH.
RECIPROCATING SAWS.
No. 566,511. Patented Aug. 25, 1896.
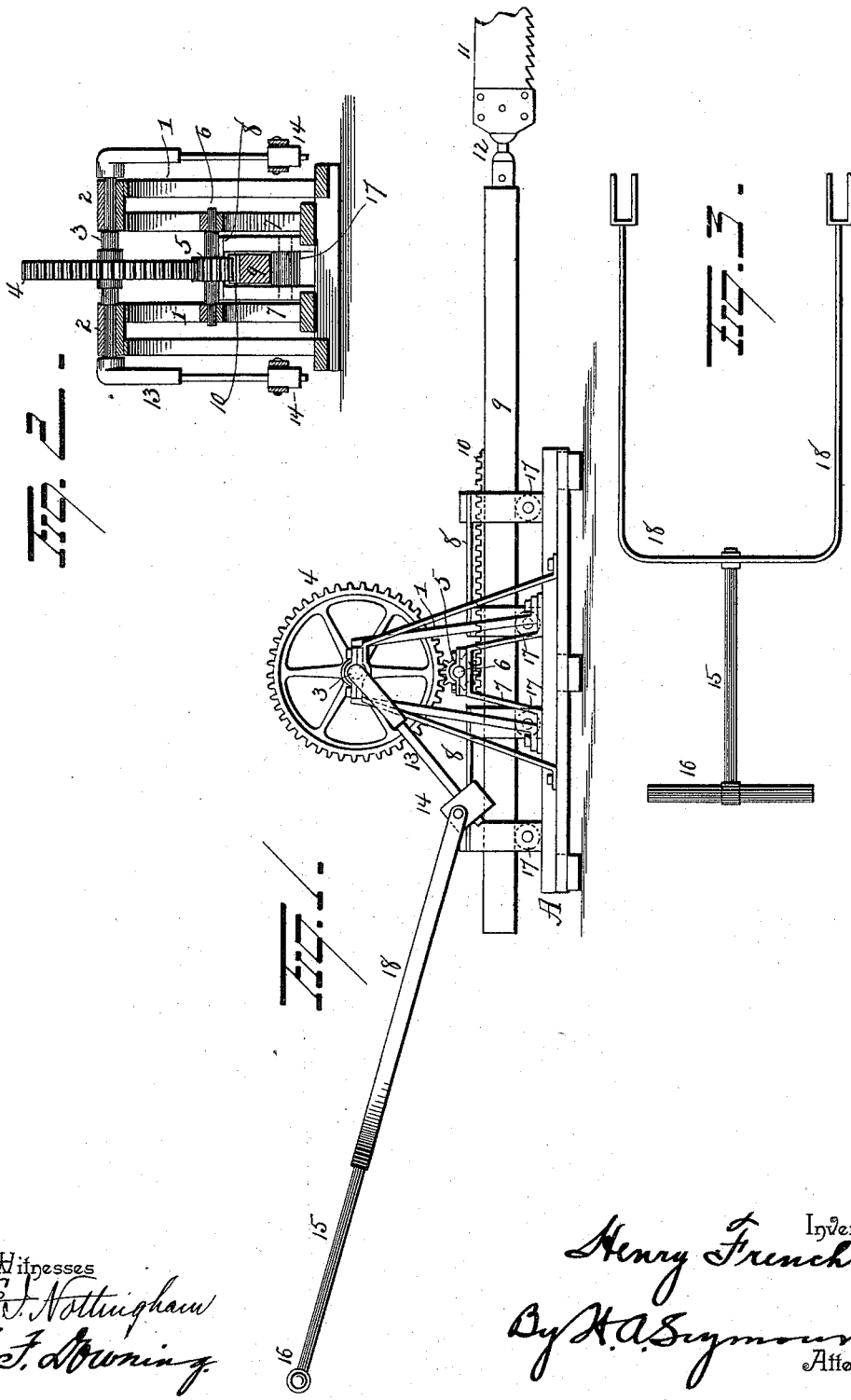

UNITED STATES PATENT OFFICE.

HENRY FRENCH, OF ELKHART, INDIANA.

RECIPROCATING SAWS.

SPECIFICATION forming part of Letters Patent No. 566,511, dated August 25, 1896.

Application filed December 6, 1895. Serial No. 571,276. (No model.)

*To all whom it may concern:*

Be it known that I, HENRY FRENCH, a resident of Elkhart, in the county of Elkhart and State of Indiana, have invented certain new and useful Improvements in Reciprocating Saws; and I do hereby declare the following to be a full, clear, and exact description of the invention, such as will enable others skilled in the art to which it appertains to make and use the same.

My invention relates to an improvement in reciprocating saws, the object of the invention being to produce a simple and efficient mechanical movement for imparting a reciprocating movement to a saw or any other device to which it is desired to impart such a movement.

A further object is to produce mechanism for the purpose stated which shall be easy to operate, by means of which considerable power can be exerted, and which shall operate effectually in the performance of its functions.

With these objects in view the invention consists in certain novel features of construction and combinations and arrangements of parts, as hereinafter set forth, and pointed out in the claims.

In the accompanying drawings, Figure 1 is a view illustrating my invention. Figs. 2 and 3 are detail views.

A represents a frame or base on which standards 1 1 are secured and provided at their upper ends with journal-boxes 2 for the accommodation of a transverse shaft 3, to which a large gear-wheel 4 is secured. The large gear-wheel 4 meshes with and transmits motion to a small pinion 5, carried by a transverse shaft 6, the latter being mounted in journal-boxes located at the upper ends of small standards 7, secured to the base or frame A. To the base or frame A guides 8 are secured, and between these guides a timber 9 is adapted to have a longitudinal reciprocating motion on rollers 17. The longitudinal timber 9 is so disposed as to be directly under the small pinion 5, and has a rack-bar 10 secured to it to receive motion from said small pinion, so that when the latter is rotated a reciprocating motion will be imparted to the longitudinal timber 9. A saw 11 may be attached to one end of the timber 9 by any suitable coupling 12, or some other device or mechanism to which it is desired to impart a reciprocating motion may be attached to said timber 9.

To the ends of the transverse shaft 4 of the large gear-wheel 3 depending arms 13 are secured, and the free ends of said arms are provided with weights 14. A yoke or bail 18 has its arms pivotally connected, respectively, to the weights 14, and to said yoke or bail an operating-rod 15 is attached, the free end of said rod being provided with a cross-bar or handle 16.

From the construction and arrangement of parts above described it will be seen that when the operator moves the yoke or bail back and forth by means of the rod 15 and handle 16 the depending arms 13 will be oscillated and the large gear-wheel 4 caused to make a partial revolution first in one direction and then the other, the pendulous action of the weighted arms 13 assisting materially in thus oscillating the gear-wheel.

When the gear-wheel 4 is oscillated in the manner above explained, the pinion 5 will be rotated first in one direction and then the other, and the motion of said pinion being imparted to the rack-bar on the timber 9 will be reciprocated and motion will thus be imparted to the device or mechanism connected with said timber 9.

My improvements are simple in construction, can be variously adapted for different purposes, and are effectual in all respects in the performance of their functions.

Having fully described my invention, what I claim as new, and desire to secure by Letters Patent, is—

1. The combination with a frame, and standards secured thereto, of a shaft mounted in the standards, a large gear-wheel secured to said shaft, a reciprocating bar or timber having a rack secured thereto, a saw connected with said bar or timber, an interposed pinion which receives motion from the large gear-wheel and transmits it to the rack, arms secured to the ends of the shaft, weights secured to said arms, and means for oscillating the weighted arms, substantially as set forth.

2. The combination with a frame or base, and guides thereon, of a timber adapted to reciprocate between the guides, a saw connected with said timber, a rack-bar on said timber, a transverse shaft, a large gear-wheel secured to said shaft, a pinion which receives motion from said gear-wheel, the pinion meshing with the rack-bar and communicating the motion of the large gear-wheel thereto, a weighted arm secured to each end of said transverse shaft, and means for oscillating said weighted arms, substantially as set forth.

3. The combination with a frame or base, of guides thereon, rollers on said frame or base, a timber adapted to reciprocate between said guides and on said rollers, a saw connected with the timber standards secured to the frame or base, a transverse shaft mounted on said standards, a large gear-wheel secured to said shaft, a rack-bar on the reciprocating timber, a pinion adapted to receive motion from the gear-wheel and transmit motion to said rack-bar to reciprocate the said timber, weighted arms secured to the ends of the transverse shaft, a yoke secured to said weighted arms, a rod secured to said yoke and a handle secured to said rod, substantially as set forth.

In testimony whereof I have signed this specification in the presence of two subscribing witnesses.

HENRY FRENCH.

Witnesses:
T. J. SETTLES,
OSCAR MOTT.